(No Model.) 2 Sheets—Sheet 1.
C. FOGELBERG & G. W. GRAVES.
Organ Bellows.
No. 237,378. Patented Feb. 8, 1881.
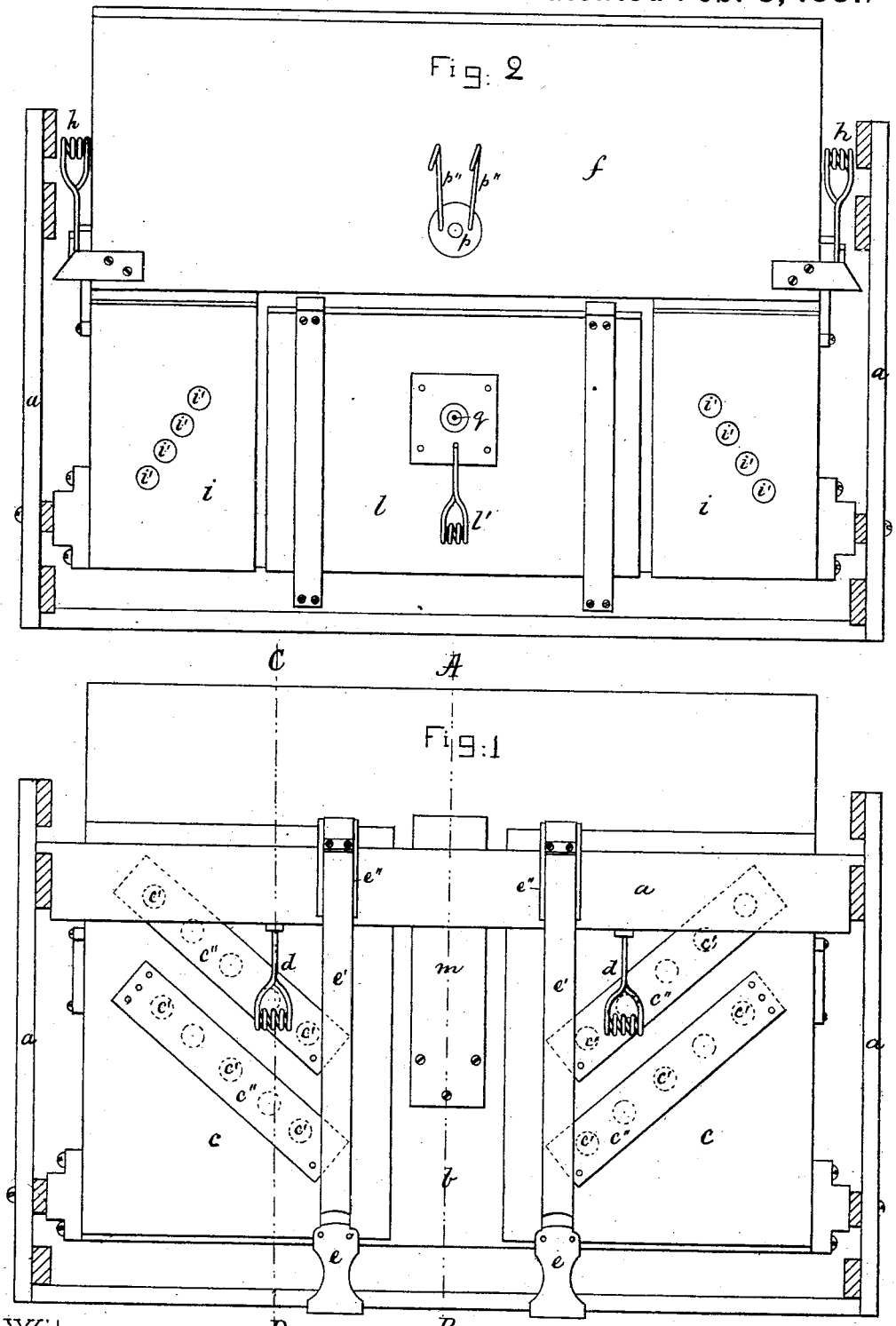
Witnesses:
Henry Chadbourn
F. Allen
Inventors:
Carl Fogelberg & George W. Graves
by Alvan Andren
atty.
N. PETERS, PHOTO-LITHOGRAPHER, WASHINGTON, D.C.

(No Model.) 2 Sheets—Sheet 2.

C. FOGELBERG & G. W. GRAVES.
Organ Bellows.

No. 237,378. Patented Feb. 8, 1881.

Witnesses:
Henry Chadbourn
F. Allen

Inventors:
Carl Fogelberg
and George W. Graves
by Alban Andrén
atty.

UNITED STATES PATENT OFFICE.

CARL FOGELBERG AND GEORGE W. GRAVES, OF CAMBRIDGE, MASS.

ORGAN-BELLOWS.

SPECIFICATION forming part of Letters Patent No. 237,378, dated February 8, 1881.

Application filed November 12, 1880. (No model.)

*To all whom it may concern:*

Be it known that we, CARL FOGELBERG and GEORGE W. GRAVES, both citizens of the United States, residing at Cambridge, in the county of Middlesex and State of Massachusetts, have jointly invented certain new and useful Improvements in Organ-Bellows; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in organ-bellows, and is especially designed for that class of organs having pipes or force-reeds combined with exhaust-reeds; and it consists of exhaust and force bellows with exhaust and force feeders combined, arranged, and operated together in a manner as will hereinafter be more fully shown and described, reference being had to the accompanying drawings, in which—

Figure 3:
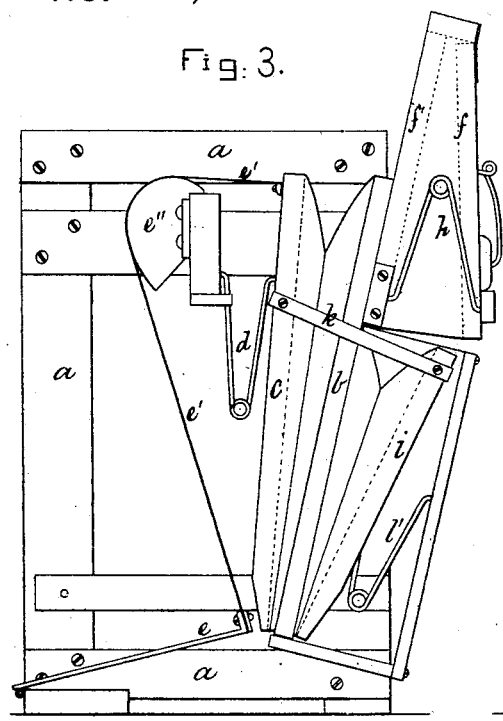
Figure 4:
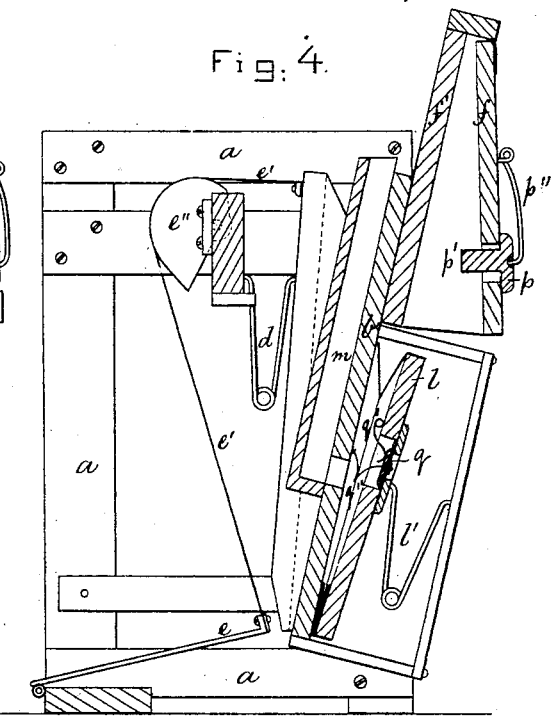
Figures 5, 6:
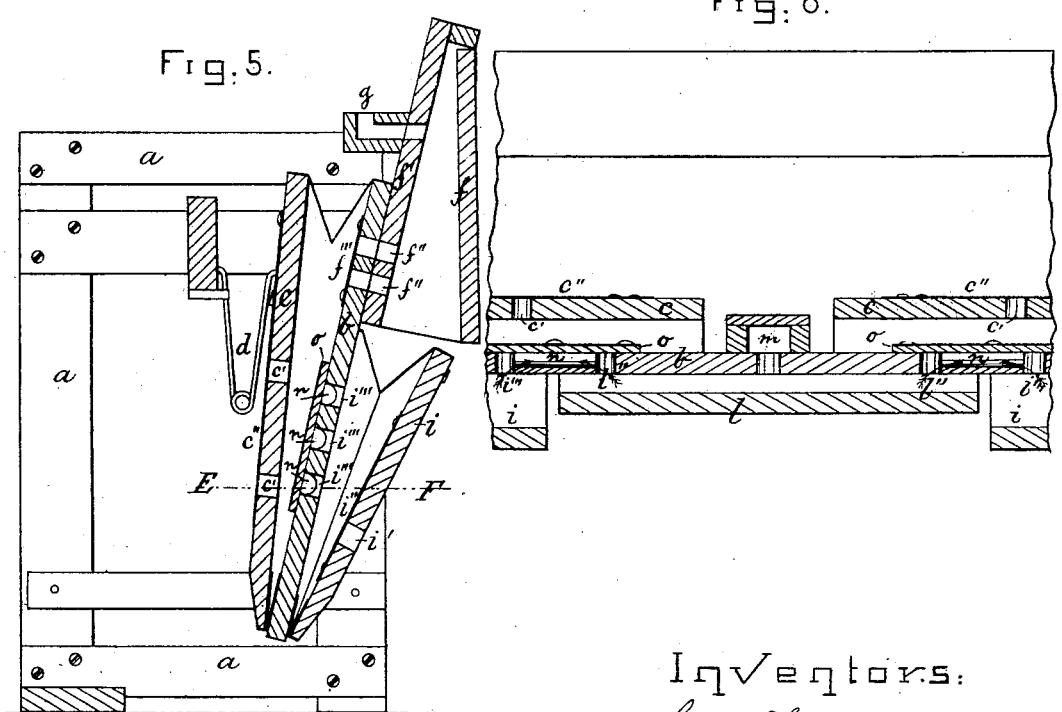

Figure 1 represents a front elevation; Fig. 2, a rear elevation; Fig. 3, an end view of the improved bellows; Fig. 4, a vertical section on the line A B, shown in Fig. 1; Fig. 5, a vertical section on the line C D, shown also in Fig. 1; and Fig. 6, a horizontal section on the line E F, shown in Fig. 5.

Similar letters refer to similar parts wherever they occur on the different parts of the drawings.

$a\ a$ is the frame, to which the center board, $b$, is rigidly secured, as usual. To the lower edge of the center board, $b$, are hinged the exhaust-feeders $c\ c$, each being provided with openings $c'\ c'\ c'$, to allow the internal air to escape from said feeders when compressed by the influence of the springs $d\ d$. The openings $c'\ c'$ are covered on the outside by the usual valve-bands $c''\ c''$, as shown in Figs. 1 and 5, which valves are caused to close the openings $c'$ when the feeders $c\ c$ are expanded by means of the pedals $e\ e$ and connecting-straps $e'\ e'$, with their cams or pulleys $e''\ e''$, as shown in Figs. 1, 3, and 4.

$f'$ is the stationary part of the exhaust-bellows $f$, which stationary board is secured to the back of the center board, $b$, as shown in Figs. 4 and 5. Through the center board, $b$, as well as through the stationary board $f$, are made perforations $f''\ f'''$, covered on the inside of the center board, $b$, by means of the valve-band $f''''$, as shown in Fig. 5. A set of such perforations and valve is arranged between the exhaust-bellows $f$ and each of the two exhaust-feeders $c\ c$.

$g$ is the air-inlet to the exhaust-bellows $f$, communicating in the usual manner with the wind-chest of the exhaust-reeds, the latter being, however, not shown in the drawings.

$h\ h$ represent the usual springs for automatically expanding the exhaust-bellows $f$.

To the back of the lower edge of the center board, $b$, are hinged the force-feeders $i\ i$, which are each provided with perforations $i'\ i'$, covered on the inside of the feeder with valve-bands $i''\ i''$, as usual. Each exhaust-feeder $c$ is connected to its opposite force-feeder, $i$, by means of a link, $k$, (shown in Figs. 1, 2, and 5,) by which arrangement the said exhaust and force feeders are simultaneously and conjointly operated by the pedals $e\ e$ and springs $d\ d$ in such a manner that while each of the exhaust-feeders $c$ is being closed for letting out the air its corresponding force-feeder $i$ is being expanded for admitting air, and vice versa, during the reciprocating motion of the pedals, which are actuated by foot-power, as usual.

To the rear of the center board, $b$, and between the force-feeders $i\ i$, is hinged the force-bellows $l$, as shown in Figs. 2 and 4, which bellows is provided with proper self-closing springs $l'\ l'$, as usual.

$m$ is a wind-conduit leading from the force-bellows $l$ to the wind-chest for the force-reeds or pipes, which latter are, however, not represented in the drawings.

To enable the air from the force-feeders $i\ i$ to be forced into their common force-bellows $l$, there are made perforations $i'''\ i'''$ and $l''$ through the center board, $b$. The perforations $i'''$ are made within the force-feeders, and the perforations $l''$ are made within the force-bellows, and each set of such perforations are connected by grooves or channels $n\ n$ cut on the front of the center board, $b$, which channels, as well as the perforations aforesaid, are covered by means of plates $o\ o$ on the front of the center board, $b$, as fully shown in Figs. 5 and 6.

$p$ is a relief-valve, with its internal plug, $p'$, and spring $p''$ on the exhaust-bellows $f$; and $q$ is a relief-valve, with its spring $q'$ and cord $q''$, on the force-bellows, $l$, in the usual manner, as shown in Figs. 2 and 4.

The operation of this our combined exhaust and force bellows is as follows: By actuating the pedals $e\ e$ the exhaust-feeders $c\ c$ and force-feeders $i\ i$ are simultaneously operated by means of the connecting-links $k\ k$, as heretofore described, and in this manner the air is exhausted from the exhaust-reed conduit $g$, exhaust-bellows $f$, and exhaust-feeders $c\ c$ simultaneously with the forcing out of air through the conduit $m$, that leads to the force-reeds or organ-pipes, by the action of the force-feeders $i\ i$ and force-bellows $l$. By releasing the foot-pressure on the pedals $e\ e$ the springs $d\ d$ act upon the exhaust-feeders $c\ c$, and by means of the connecting-links $k\ k$ upon the force-feeders $ii$, closing the former and expanding the latter, and in this manner the air is continuously exhausted from the exhaust-reeds and forced to the force-reeds or organ-pipes to produce the desired musical sounds.

What we wish to secure by Letters Patent, and claim, is—

1. The herein-described combined exhaust and force bellows for musical instruments, consisting of the exhaust-feeders $c\ c$ and force-feeders $i\ i$, connected together by means of the links $k\ k$, and provided with their respective exhaust-bellows $f$ and conduit $g$, and force-bellows $l$ and conduit $m$, as and for the purpose set forth.

2. In organ-bellows, for the purpose set forth, the exhaust-feeders $c\ c$, force-feeders $i\ i$, exhaust-bellows $f$, and force-bellows $l$, all combined, arranged, and attached to the single-piece center board, $b$, in a manner as described.

In testimony whereof we have affixed our signatures in presence of two witnesses.

CARL FOGELBERG.
GEORGE W. GRAVES.

Witnesses:
ALBAN ANDRÉN,
GEO. H. RAND.